United States Patent
Melbert

(10) Patent No.: US 6,847,881 B2
(45) Date of Patent: Jan. 25, 2005

(54) METHOD AND DEVICE FOR CONTROLLING PIEZO-DRIVEN FUEL INJECTION VALVES

(75) Inventor: Joachim Melbert, Deisenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/790,475

(22) Filed: Mar. 1, 2004

(65) Prior Publication Data

US 2004/0163628 A1 Aug. 26, 2004

Related U.S. Application Data

(63) Continuation of application No. PCT/DE02/03228, filed on Sep. 2, 2002.

(30) Foreign Application Priority Data

Sep. 5, 2001 (DE) .......................................... 101 43 502

(51) Int. Cl.[7] ............................................. F02M 51/00
(52) U.S. Cl. ....................... 701/103; 123/478; 123/446; 73/119 A; 310/316.03
(58) Field of Search .......................... 701/103; 123/478, 123/446, 498; 73/119 A; 310/316.03, 317

(56) References Cited

U.S. PATENT DOCUMENTS

| 4,019,481 A | * | 4/1977 | Lakra ......................... 123/447 |
| 4,432,228 A | * | 2/1984 | Kuschmierz et al. ..... 73/119 A |
| 6,486,587 B2 | * | 11/2002 | Klenk et al. ........... 310/316.03 |

FOREIGN PATENT DOCUMENTS

| DE | 43 08 811 A1 | 1/1994 | .......... F02D/41/40 |
| DE | 43 12 587 A1 | 10/1994 | .......... F02M/45/02 |
| DE | 199 21 456 A1 | 11/2000 | .......... F02D/41/30 |
| DE | 199 30 309 A1 | 1/2001 | .......... F02D/41/38 |
| DE | 199 30 309 C2 | 12/2001 | .......... F02D/41/38 |
| WO | WO99/67527 | 12/1999 | .......... F02M/15/00 |

* cited by examiner

*Primary Examiner*—Hieu T. Vo
(74) *Attorney, Agent, or Firm*—Baker Botts L.L.P.

(57) ABSTRACT

The force exerted on an injector valve (4, 5), by the piezo-actuator (3) on a main injection, is determined by means of a non-linear actuator model (8) and thus the gradient (−dFHdt) of the drop-off in force after the force maximum (FHmax) and a threshold value (G) are derived, with which a gradient (−dFV/dt) determined for the pre- or post-injection is compared and, depending on the result of the comparison, the signal parameter (p) for the subsequent pre- or post-injection(s) is corrected.

12 Claims, 3 Drawing Sheets

METHOD AND DEVICE FOR CONTROLLING PIEZO-DRIVEN FUEL INJECTION VALVES

CROSS REFERENCE TO RELATED APPLICATION

This application is a continuation of copending International Application No. PCT/DE02/03228 filed Sep. 2, 2002 which designates the United States, and claims priority to German application no. 101 43 502.9 filed Sep. 5, 2001.

TECHNICAL FIELD OF THE INVENTION

The invention relates to a method for controlling piezo-driven fuel injection valves. The invention also relates to a device for carrying out this method.

DESCRIPTION OF THE RELATED ART

The fuel injection process in diesel engines is usually carried out in several sections in which case to achieve a more gentle combustion curve one or several pre- or post-injections are allocated to each main injection in the case of which the injected fuel volume is little compared to the volume of the main injection.

For a precise dosage of the volumes of fuel, particularly the small volumes and for optimizing the injection moments, quick switching valves are required for which piezo-driven injection valves are increasingly being used.

Because of the slight maximum change in length of the used piezo-elements (stacks), the piezo-actuator drives a hydraulic servo circuit which then moves the main valve. By means of control electronics, the electrical control of the piezo-actuator is carried out in such a way that the desired volume of fuel is injected.

Because it is not possible to detect volumes of fuel or mechanical movements in the injection valve, the electrical control signals when injecting smaller volumes of fuel are embodied in such way with regard to the control duration and amplitude that a safe injection follows. Because of the tolerances for pressure fluctuations in the fuel feed line, parameter tolerances of the system and the wide operating temperature range, this generally involves an over-dosage of the volumes of fuel. Therefore, on account of the charge or energy input into the piezo-actuator, the piezo-deflection was selected previously.

From DE 196 44 521 A1 a method is known for controlling the capacitive actuator of a fuel injection valve in which, in order to achieve a constant stroke, an energy input allocated to this stroke is fed to it.

DE 199 30 309 C2 describes a method for controlling the injection volume of a piezo-fuel injection valve in the case of which the voltage at the piezo-actuator is detected after its initial charging and from this the start of the injection or the needle opening time for the pre- and main injection of the injection valve is derived.

SUMMARY OF THE INVENTION

The object of the invention is to specify a method which specifies the injected fuel volume for the pre-/post-injections more exactly and by means of which it can be monitored whether or not fuel is being pre- or post-injected. It is also the object of the invention to create a device for executing this method.

With regard to the method, this object of the invention can be achieved by a method for controlling a fuel injection valve by means of a piezo-actuator, particularly for determining the injected fuel volume for pre- or post-injections, comprising the steps of:

determining, from the current fed to the piezo-actuator for a main fuel injection and the voltage then building up at it, the temporal curve of the force exerted on the fuel injection valve, determining, from this temporal curve, the gradient of the tangent of the drop-off in force occurring after the force maximum, specifying a threshold value derived from these gradients of the tangent, determining, from the current fed to the piezo-actuator for a post-injection or pre-injection of a subsequent injection process following the main fuel injection and the subsequent voltage building up at it, the temporal curve of the force exerted by it on the fuel injection valve, determining, from this temporal curve, the gradient of the tangent of the drop-off in force occurring after the force maximum, and comparing the amount of this determined gradient with the threshold value, in which case it is assumed that a post- or pre-injection has taken place if the amount of the gradient exceeds the threshold value and it is assumed that a post- or pre-injection has not taken place if the amount of the gradient is less than the threshold value.

The temporal curve of the force exerted on the fuel injection valve for each fuel injection can be determined by means of a non-linear actuator model. Alternatively to the temporal curve of the force exerted on the fuel injection valve, the temporal route curve or the speed of the piezo-actuator can be used as the comparison variable for a correct or incorrect injection process. At specified time intervals or after a specified number of fuel injections, the current fed to the piezo-actuator for each pre- or post-injection can adaptively become less by a specific, small amount in each case until the gradient jumps from the value allocated to a tangent to a clearly smaller value allocated to the tangent for which a fuel injection no longer takes place. The threshold value can be specified to be a value that lies between the amount values of the gradients of the tangent and the tangent.

The object can also be achieved by a device for determining the injected fuel volume for pre- or post-injections, comprising a fuel injection valve controlled by a piezo-actuator, a pulsator with a downstream end stage wherein control signals and signal parameters are fed to the pulsator from which it generates a signal shape for an output current of the end stage that is fed to the piezo-actuator, an analog/digital converter in which electrical signals that can be picked up at an input of the piezo-actuator are converted into digital signals, an arithmetic-logic unit in which the digital signals are processed for signal parameters for the pulsator, wherein the arithmetic-logic unit comprises a non-linear actuator model by means of which from the signals that can be picked up at the input of the piezo-actuator for each fuel injection, the temporal curve of force exerted on the fuel injection valve by the piezo-actuator, is determined and from the temporal curve the gradient of the drop-off in force after a force maximum is determined arithmetically and from the gradient a threshold value is derived, a storage unit in which the gradient of each main fuel injection and the derived threshold value are continuously stored, and a comparator in which the amount of the gradient determined for each pre- or post-injection is compared with the threshold value stored in the storage unit, wherein a parameter correction is integrated in the comparator that corrects the signal parameters that can be fed to the pulsator according to the result of the comparison.

The object can furthermore be achieved by a device for determining the injected fuel volume for pre- or post-injections, comprising a fuel injection valve controlled by a piezo-actuator, a pulsator receiving control signals and signal parameters from which it generates a signal shape for an output current that is fed to the piezo-actuator, an analog/digital converter coupled with an input of the piezo-actuator, an arithmetic-logic unit coupled with said analog/digital converter and said pulsator, wherein the arithmetic-logic unit comprises a non-linear actuator model by means of which the temporal curve of force exerted on the fuel injection valve is determined from which the gradient of the drop-off in force after a force maximum is determined from which a threshold value is derived, a storage unit in which the gradient of each main fuel injection and the derived threshold value are continuously stored, and a comparator receiving the gradient determined for each pre- or post-injection and the threshold value stored in the storage unit for comparison, wherein a parameter correction is integrated in the comparator that corrects the signal parameters according to the result of the comparison.

The pulsator may comprise an end stage. The end stage can be a current amplifier for the high-impedance control of the piezo-actuator. The gradient allocated to a tangent can be determined in the arithmetic-logic unit.

The method according to the invention is based on detecting and evaluating the forces exerted by the piezo-actuator during an opening process, determined from the electrical signals (the current $i_p$ fed to the piezo-actuator and the voltage $u_p$ building up at it) by the additional means of a non-linear piezo-model and an adaptive method for evaluating the temporal force gradients occurring in the servo valve.

As a result, it is possible to safely determine the opening process of the injection valve independent of the fuel pressure and the valve temperature and to adaptively arrange the control signals in such a way that the desired minimum fuel injections are carried out without over-dosage.

BRIEF DESCRIPTION OF THE DRAWINGS

Embodiments of the invention will emerge from the description which follows and from the accompanying drawings.

They are as follows.

DETAILED DESCRIPTION OF THE PREFERRED EMBODIMENTS

Figure 1:
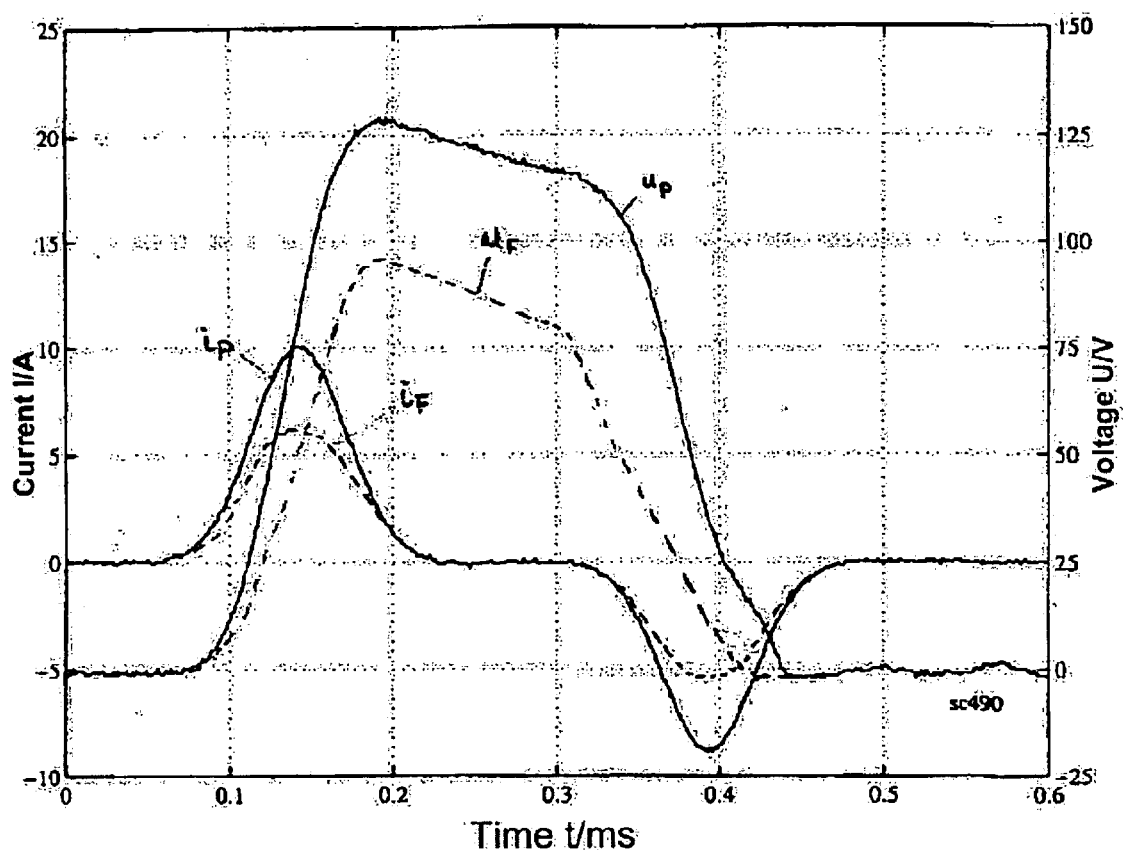
FIG. 1 Current $i_p$ fed to one piezo-actuator during an opening process of the valve with or without fuel injection and the resulting voltage $u_p$ building up at it, FIG. 2 the forces exerted by a piezo-actuator during an opening process on a valve with or without fuel injection and the resulting variables, and FIG. 3 a device for carrying out the method according to the invention.

FIG. 1, on the one hand, shows the current fed $i_p$ to a piezo-actuator during an opening process of the valve connected to a fuel injection at a fuel pressure of for example 1200 bar and the resulting voltage $u_p$ building up at the piezo-actuator (solid curves) and, on the other hand, a current $i_F$ and the resulting voltage $u_F$ building up at the piezo-actuator (dotted curves) if there is no fuel injection.

Should pressure fluctuations in the fuel feed line, parameter tolerances of the system and the wide operating temperature range be taken into consideration, it is unclear from these curve pairs whether or not a fuel injection is occurring.

Figure 2A:
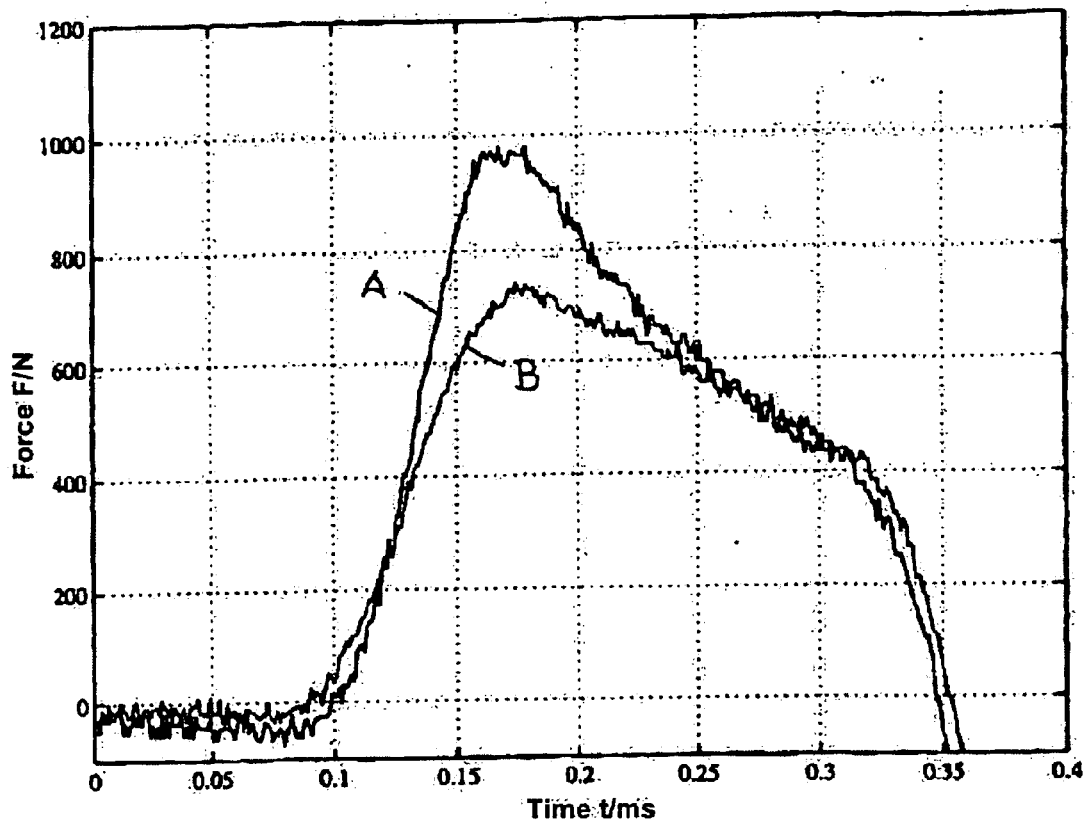

FIG. 2a shows—again at a fuel pressure of for example 1200 bar—the forces exerted by a piezo-actuator during an opening process on a valve with or without fuel injection that were determined from the measured current $i_p$ and the measured piezo-voltage $u_p$.

Figure 2B:
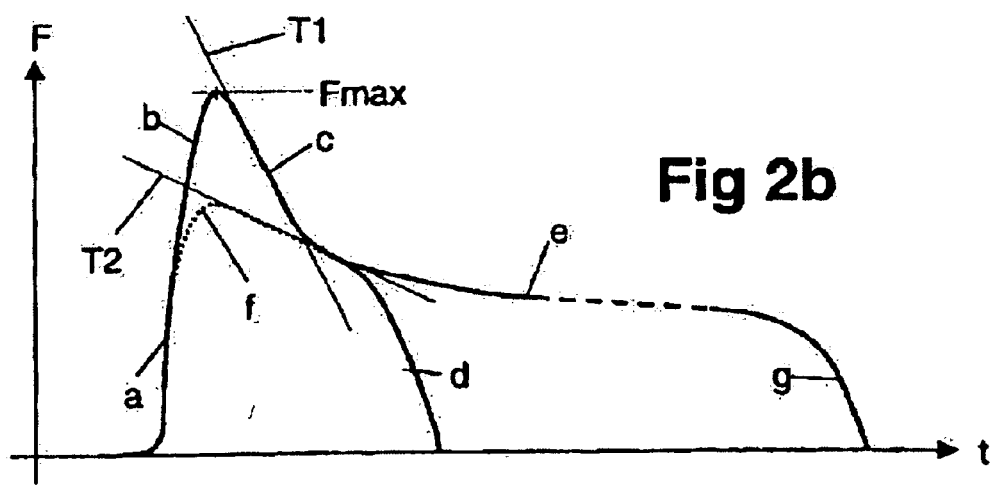

The measured force curves A and B shown in FIG. 2a are explained in greater detail in FIG. 2b. Controlling the piezo-actuator with sufficient current $i_p$ results in a (curve A) rapid rise in force from zero to a force maximum Fmax (opening of the valve, sections a and b) and then a rapid drop-off in force (section c) that follows a gradient –dF/dt, i.e. a tangent T1 and subsequently slows down a little (section e) before it, depending on the control duration, sooner or later again drops below the zero line:

in the case of a minimum injection duration/volume (pre-injection) in section d, in the case of a higher injection duration/volume (e.g. main injection that is characterized with a longer partially dotted section e) in section g.

The shape of the force curve of sections a, b and c to a large extent is independent of the type of electronic control because of a driver stage with slight output resistance (voltage end stage), with high internal resistance (current end stage) or with a rotation end stage in which the piezo-actuator is part of a resonance circuit. The reached maximum value Fmax only depends on the current $i_p$ that is fed to the piezo-actuator.

According to the invention, the negative jump in force is evaluated by weighting the electric signals of the piezo-actuator (current $i_p$, voltage $u_p$) by means of a non-linear piezo-model. The evaluation takes place via the gradients –dF/dt of the tangent T1 of the drop-off in force after the force maximum Fmax. This gradient strongly depends on the exemplary scatterings and the operating conditions (temperature, fuel pressure, using a piezo-actuator, aging effects, etc.).

Particularly advantageous for the evaluation of the drop-off in force is the application of a high-impedance control by means of a current amplifier.

Alternatively or as an extra measure, the route curve or the speed of the piezo-actuator can also be compared with a reference curve as has already been mentioned above.

For a long main injection compared to a pre-injection in the case of sufficient height and duration of the electrical control, it can be assumed that the valve opens safely. For a main injection, the gradient $-dF_H/dt$ of the tangent T1 of the drop-off in force can be determined after the force maximum $F_H$max and therefore the gradient $-dF_V/dt$ can be monitored for the following and, if required, further post- or pre-injections; by comparing the gradient(s) determined of these subsequent post- or pre-injections with a specific threshold value G from the gradients determined of the tangent T1 of the main injection, it is easy to determine whether or not a fuel injection or fuel injections did or did not take place: if the amount |–dF/dt| of the gradient of the pre-/post-injection exceeds the threshold value G, it is assumed that a pre-/post-injection took place; if the amount is less, it is assumed that no pre-/post-injection took place.

With correct fuel injection the results, because the servo valve is released, is namely a rapid force surge with a greater amplitude than in the case of an incorrect injection. This distinction is of particular importance for a pre-/post-injection with low fuel volumes.

The gradient of the drop-off in force after the force maximum $F_H$max can be determined continually because main injections take place continuously during operation in an internal combustion engine. As a result, the interferences of all the above-mentioned effects can be eliminated.

Since, as a result of aging effects, the gradients of the tangents T1 and T2 also do not remain constant, it is recommended at greater temporal intervals or after a specified number of fuel injections to also determine and, if required store, the gradients of tangent T2 (for pre- or post-injections) in order to be able to safely determine the threshold value G and insert it between the values of the gradients of tangents T1 and T2.

This is done as follows: if the current $i_p$ fed to the piezo-actuator in adaptive stages is reduced by a specific, small amount for each pre-injection process, the force Fmax of the piezo-actuator always becomes smaller, but the tangent T1 approximately retains its gradient. Only at the moment when a current $i_F$ is reached and fuel is no longer being injected does the curve of the current become flatter—FIG. 2a, curve B and FIG. 2b, section f (dotted curve) and does the tangent "jump" from T1 to T2.

Figure 3:
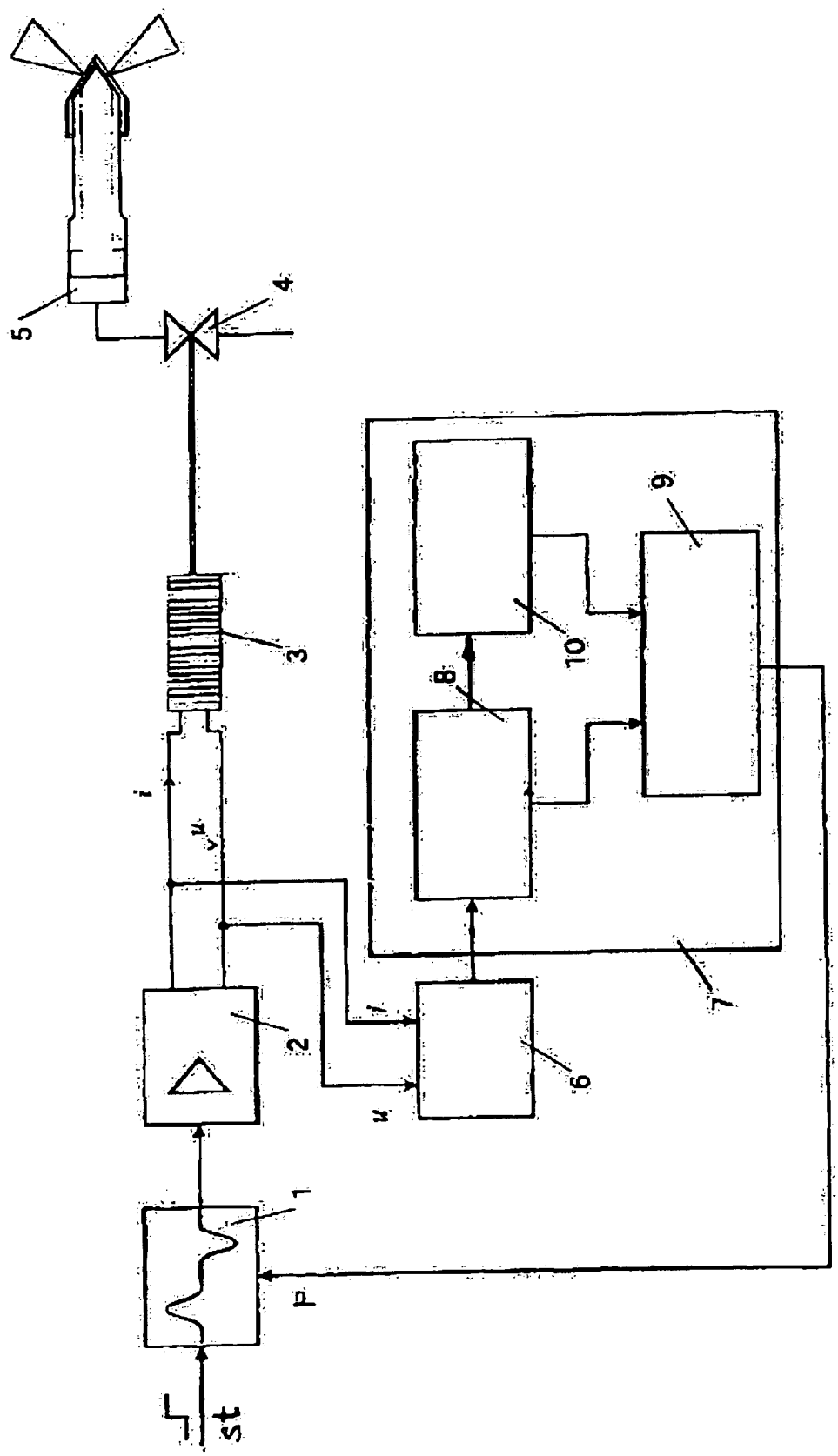

FIG. 3 shows a diagram of a device for executing the method according to the invention which, with a suitable control program, can carry out the electrical control of the fuel pre-injection in such a way that in addition to the main injections, safe pre-/post-injections can also be carried out for the slightest possible fuel overdosage.

This device has a pulsator 1 which, by means of signal parameters p—obtained from an arithmetic-logic unit 7—and control signals st generates the signal shape for the output current of a subsequent current amplifier end stage 2. This output current $i_p$ is fed to a piezo-actuator 3 that acts on a servo valve 4 and by means of which a fuel injection valve 5 is actuated.

The electrical signals at the input of the piezo-actuator (current $i_p$ fed to it and the drop-off in voltage $u_p$ at it) are measured and converted in an analog/digital converter 6 to digital values and subsequently processed in the above-mentioned arithmetic-logic unit 7.

The arithmetic-logic unit 7 has an actuator model 8, by means of which, from the values (current $i_p$ and voltage $u_p$) measured at a main injection, the temporal curve $F_H(t)$ of the force F is determined arithmetically at the output of the piezo-actuator 3 (see FIG. 2a) and thus the gradient $-dF_H/dt$ of the drop-off in force after the force maximum $F_H$max, i.e. the gradient of the tangent T1 (FIG. 2b).

This actuator model includes the non-linear coherences between charging or voltage and mechanical deflection as well as work point-dependent parameters. The model also takes the dielectric hysteresis of the piezo-actuator into consideration. With that, this actuator model allows the electrical variables to be referred back to the mechanical variables and the simulation of the piezo-actuator within the range of the pulse-shaped deflection.

A storage unit 10 is also arranged in the arithmetic-logic unit 7 in which the temporal curve $F_H(t)$ of force $F_H$ determined from a main injection at the output of the piezo-actuator 3 or the resulting determined gradient $-dF_H/dt$ of the drop-off in force after the force maximum $F_H$max (the gradient of the tangent T1, see FIG. 2b), the threshold value G and, i.e. the gradient of the tangent T2 is stored, if required.

A comparator 9 now compares the gradients $-dF_v/dt$ determined for a pre- or post-injection, i.e. its amount with the threshold value G stored in the storage unit 10. If this amount of the gradient exceeds the threshold value G, it is assumed that a correct pre- or post-injection took place. If the amount of the gradient is less than the threshold value G, an incorrect injection is assumed to have taken place. Via the comparator 9 in which a parameter correction is also integrated, the signal parameters (for example, amplitude and curve shape of the current $i_p$) are corrected that are fed to the pulsator 1 as mentioned above. By changing the signal parameters, the pulsator 1 changes the signal shape for the next pre- or post-injection(s). Thus, it can be ensured that for pre- or post-injections in each case a specified, also minimum volume of fuel is injected.

Alternatively or supplementary, the force F exerted by the piezo-actuator 3 can also be used, as mentioned above, to compare the route curve s(t) or the speed v(t) of the piezo-actuator 3 with a reference curve as the comparison variable for a correct or incorrect injection process.

I claim:

1. A device for determining the injected fuel volume for pre- or post-injections, comprising:

a fuel injection valve controlled by a piezo-actuator, a pulsator receiving control signals and signal parameters from which it generates a signal shape for an output current that is fed to the piezo-actuator, an analog/digital converter coupled with an input of the piezo-actuator, an arithmetic-logic unit coupled with said analog/digital converter and said pulsator, wherein the arithmetic-logic unit comprises a non-linear actuator model by means of which the temporal curve of force exerted on the fuel injection valve is determined from which the gradient of the drop-off in force after a force maximum is determined from which a threshold value is derived, a storage unit in which the gradient of each main fuel injection and the derived threshold value are continuously stored, and a comparator receiving the gradient determined for each pre- or post-injection and the threshold value stored in the storage unit for comparison, wherein a parameter correction is integrated in the comparator that corrects the signal parameters according to the result of the comparison.

2. A device for determining the injected fuel volume for pre- or post-injections, comprising:

a fuel injection valve controlled by a piezo-actuator, a pulsator with a downstream end stage wherein control signals and signal parameters are fed to the pulsator from which it generates a signal shape for an output current of the end stage that is fed to the piezo-actuator, an analog/digital converter in which electrical signals that can be picked up at an input of the piezo-actuator are converted into digital signals, an arithmetic-logic unit in which the digital signals are processed for signal parameters for the pulsator, wherein the arithmetic-logic unit comprises a non-linear actuator model by means of which from the signals that can be picked up at the input of the piezo-actuator for each fuel injection, the temporal curve of force exerted on the fuel injection valve by the piezo-actuator, is determined and from the temporal curve the gradient of the drop-off in force after a force maximum is determined arithmetically and from the gradient a threshold value is derived, a storage unit in which the gradient of each main fuel injection and the derived threshold value are continuously stored, and a comparator in which the amount of the gradient determined for each pre- or post-injection is compared with the threshold value stored in the storage unit, wherein a parameter correction is integrated in the comparator that corrects the signal parameters that can be fed to the pulsator according to the result of the comparison.

3. The device according to claim 2, wherein the end stage is a current amplifier for the high-impedance control of the piezo-actuator.

4. The device according to claim 2, wherein the gradient allocated to a tangent is determined in the arithmetic-logic unit.

5. The device according to claim 2, wherein the pulsator comprises an end stage.

6. The device according to claim 5, wherein the end stage is a current amplifier for the high-impedance control of the piezo-actuator.

7. The device according to claim 2, wherein the gradient allocated to a tangent is determined in the arithmetic-logic unit.

8. A method for controlling a fuel injection valve by means of a piezo-actuator, particularly for determining the injected fuel volume for pre- or post-injections, comprising the steps of:

determining, from the current fed to the piezo-actuator for a main fuel injection and the voltage then building up at it, the temporal curve of the force exerted on the fuel injection valve, determining, from this temporal curve, the gradient of the tangent of the drop-off in force occurring after the force maximum, specifying a threshold value derived from these gradients of the tangent, determining, from the current fed to the piezo-actuator for a post-injection or pre-injection of a subsequent injection process following the main fuel injection and the subsequent voltage building up at it, the temporal curve of the force exerted by it on the fuel injection valve, determining, from this temporal curve, the gradient of the tangent of the drop-off in force occurring after the force maximum, and comparing the amount of this determined gradient with the threshold value, in which case it is assumed that a post- or pre-injection has taken place if the amount of the gradient exceeds the threshold value and it is assumed that a post- or pre-injection has not taken place if the amount of the gradient is less than the threshold value.

9. The method according to claim 8, wherein the temporal curve of the force exerted on the fuel injection valve for each fuel injection is determined by means of a non-linear actuator model.

10. The method according to claim 8, wherein alternatively to the temporal curve of the force exerted on the fuel injection valve, the temporal route curve or the speed of the piezo-actuator can be used as the comparison variable for a correct or incorrect injection process.

11. The method according to claim 8, wherein at specified time intervals or after a specified number of fuel injections, the current fed to the piezo-actuator for each pre- or post-injection adaptively becomes less by a specific, small amount in each case until the gradient jumps from the value allocated to a tangent to a clearly smaller value allocated to the tangent for which a fuel injection no longer takes place.

12. The method according to claim 11, wherein the threshold value is specified to be a value that lies between the amount values of the gradients of the tangent and the tangent.

* * * * *